(12) United States Patent
Theriot (10) Patent No.: US 10,414,004 B1
(45) Date of Patent: Sep. 17, 2019

(54) PIPE ALIGNMENT SYSTEM

(71) Applicant: Mathey Investments, Inc., Tulsa, OK (US)

(72) Inventor: Peter Theriot, Tulsa, OK (US)

(73) Assignee: Mathey Investments, Inc., Tulsa, OK (US)

( * ) Notice: Subject to any disclaimer, the term of this patent is extended or adjusted under 35 U.S.C. 154(b) by 64 days.

(21) Appl. No.: 15/812,488

(22) Filed: Nov. 14, 2017

Related U.S. Application Data (60) Provisional application No. 62/422,240, filed on Nov. 15, 2016.

(51) Int. Cl.
*B23K 37/00* (2006.01)
*B23K 37/053* (2006.01)
*F16L 13/02* (2006.01)

(52) U.S. Cl.
CPC .......... *B23K 37/0533* (2013.01); *F16L 13/02* (2013.01)

(58) Field of Classification Search
CPC ............ B23K 37/0533; B23K 2101/06; B23K 2101/10; B23K 31/02; B25B 5/147; B25B 5/003; B25B 11/02; B25B 13/52
See application file for complete search history.

(56) References Cited

U.S. PATENT DOCUMENTS

| | | | | |
|---|---|---|---|---|
| 1,848,527 A * | 3/1932 | Hickey | ............. | B23K 37/0533 138/99 |
| 3,480,270 A * | 11/1969 | Gill | ........................ | B25B 13/52 248/230.8 |
| 3,944,202 A * | 3/1976 | Dearman | ........... | B23K 37/0533 269/130 |
| 4,356,615 A * | 11/1982 | Dearman | ........... | B23K 37/0533 29/525 |
| 4,623,085 A * | 11/1986 | Dearman | ........... | B23K 37/0533 228/49.3 |
| 10,093,000 B2 * | 10/2018 | Donaldson | .............. | B25B 11/02 |
| 2015/0174706 A1 * | 6/2015 | McClure | ............ | B23K 37/0533 269/45 |
| 2015/0306682 A1 * | 10/2015 | Merle | ....................... | B23C 3/02 82/113 |

* cited by examiner

*Primary Examiner* — Erin B Saad
(74) *Attorney, Agent, or Firm* — Head, Johnson, Kachigian & Wilkinson, PC (57) ABSTRACT

A pipe alignment apparatus to align a pair of adjacent pipe ends together. The apparatus includes a first pair of arcuate frames joined together to move between an open position and a closed position. A second pair of arcuate frames joined together moves between an open position and closed position. A plurality of jackscrews is provided on the first pair of arcuate frames and on the second pair of arcuate frames. A plurality of adjustable turnbuckles extends between the first pair of frames and the second pair of frames.

6 Claims, 6 Drawing Sheets

PIPE ALIGNMENT SYSTEM

CROSS REFERENCE TO RELATED APPLICATIONS

This application claims priority to U.S. Provisional Patent Application No. 62/422,240, filed Nov. 15, 2016, which is herein incorporated by reference.

BACKGROUND OF THE INVENTION

1. Field of the Invention

The present invention is directed to a pipe alignment apparatus and system in order to align a pair of adjacent pipe ends together. In particular, the present invention is directed to a pipe alignment system and apparatus to position and align a pair of adjacent pipe ends together in advance of and during welding of the pipe ends.

2. Description of the Related Art

Pipelines and other liquid and gas transmission systems are often assembled from lengths or sections of pipes or tubes. The pipes or tubes are joined together by welding in the field. The ends of adjacent pipe sections may be brought together in various ways for performing welding operations. The pipes should be aligned so that the axis of each pipe is concentric with the other. Additionally, a consistent gap width, meeting the appropriate welding parameters, must be set and kept throughout the entire welding process.

Furthermore, on some occasions, it is necessary to reform or slightly reshape a pipe that is not cylindrical but is slightly out of round.

Accordingly, it would be desirable to provide a pipe alignment system that will align ends of adjacent pipes both in advance of and during welding operations.

It would also be desirable to provide a pipe alignment system capable of adjusting positioning of adjacent pipes in all three dimensions or directions.

It would also be desirable to provide a pipe alignment system that is capable of reforming one or both of the pipes prior to welding operations.

It would also be desirable to provide a pipe alignment system that can remain in place during welding operations.

It would be further desirable to provide a pipe alignment system wherein the apparatus may be quickly and easily attached before welding and then quickly and easily detached from the pipe ends after welding.

It would be further desirable to provide a pipe alignment system that may be utilized with a variety of pipe diameter sizes so that a single pipe alignment system may be utilized with different pipe diameters.

SUMMARY OF THE INVENTION

The present invention is directed to a pipe alignment apparatus and system to align a pair of adjacent pipe ends together.

In one preferred embodiment, a first pair of arcuate frames surrounds a first pipe wherein the first pair of frames are joined together and move between an open and a closed position. A second pair of arcuate frames surrounds a second pipe. The second pair of frames are joined together to move between an open and a closed position.

An inner diameter of each of the pairs of frames is greater than an outer diameter of the respective pipes.

A plurality of jackscrews on the first pair of arcuate frames is arranged radially with respect to the pipe ends. A plurality of jackscrews on the second pair of arcuate frames is arranged radially with respect to the pipe ends. Each of the jackscrews is threadably engaged with one of the pair of arcuate frames.

A plurality of adjustable turnbuckles extends between the first pair of frames and the second pair of frames.

The system is capable of adjusting the pipe ends in three directions or dimensions in order to align the first pipe with the second pipe for welding.

In an alternate preferred embodiment, a first chain circumnavigates a first pipe adjacent an end of the first pipe. A first mechanical tensioning mechanism tightens the first chain around the first pipe. A second chain circumnavigates a second pipe adjacent to an end of the second pipe. A second mechanical tensioning mechanism tightens the second chain around the second pipe. A plurality of universal jackbars are attached to the first chain or to the second chain.

A plurality of adjustable turnbuckles extends between the first chain and the second chain.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The present invention is utilized to align the ends of adjacent pipes in advance of and during welding operations. The present invention may be utilized in a shop, in a plant, or even in the field.

Figure 1:
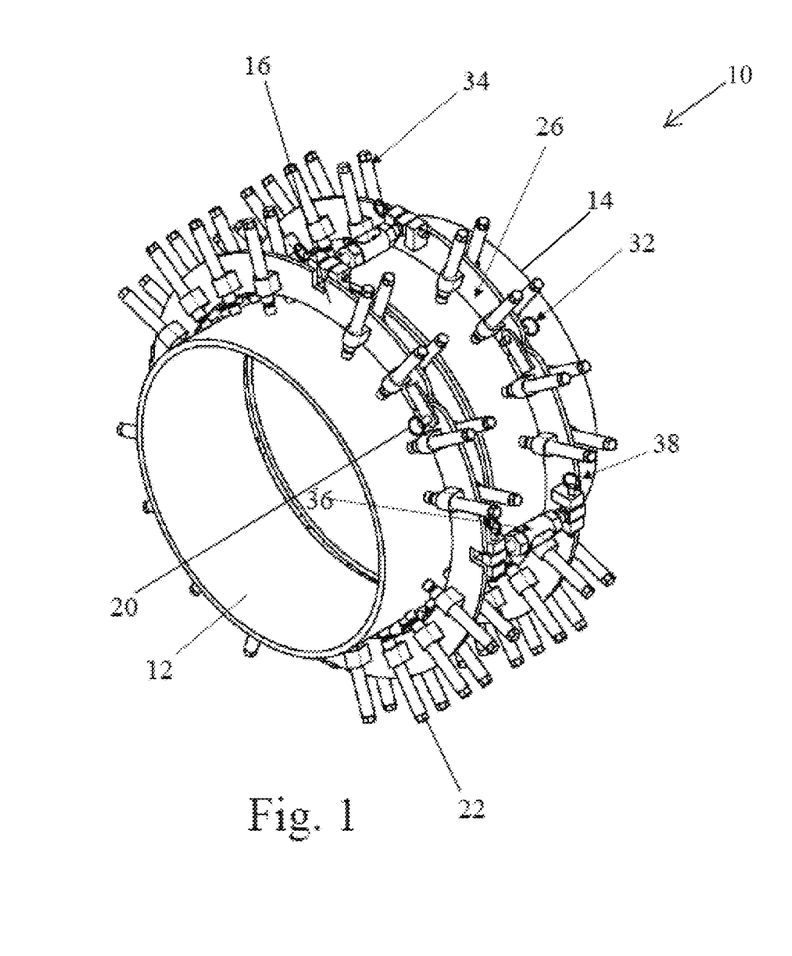
FIG. 1 illustrates a perspective view of a first preferred embodiment of a pipe alignment system constructed in accordance with the present invention.
Figures 2, 3:
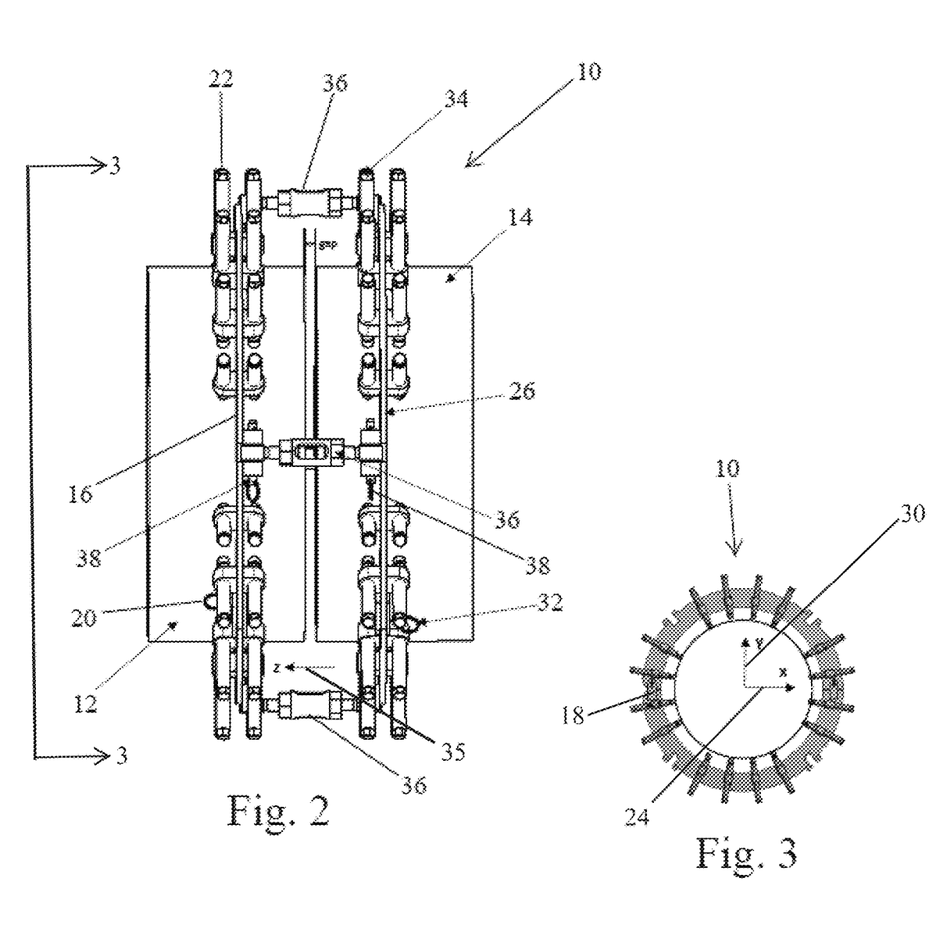
FIG. 2 illustrates a front view of the pipe alignment system shown in FIG. 1.
FIG. 3 illustrates a side view of the pipe alignment system shown in FIG. 1.

Referring to the drawings in detail, FIG. 1 illustrates a perspective view, FIG. 2 illustrates a front view, and FIG. 3 illustrates a sectional view of a first preferred embodiment of a pipe alignment system 10 constructed in accordance with the present invention.

A first tube or pipe 12 having a pipe end is moved adjacent a second tube or pipe 14 having a pipe end. In one preferred arrangement, the pipe ends should be within 1 to 2 inches from each other, but not touching.

A first pair of arcuate frames 16 surrounds the first pipe 12. Each of the frames is in the form of a half cylinder. The first pair of frames 16 is joined together around the first pipe 12 when in the closed position surrounding the pipe. The first pair of frames 16 is installed near but not at the end of the first pipe 12. In one configuration, a hinge 18 (visible in FIG. 3) on one side of the frames permits rotational movement of the first pair of frames 16 between an open position in order to install and remove the frames and a closed position as shown in FIGS. 1, 2 and 3. The frames 16 may be held together when in the closed position by a quick release pin or pins 20.

The inner diameter of the frames 16 is larger than the outer diameter of the pipes so that the system 10 may be used with a variety of pipe diameter sizes.

Once the first pair of frames 16 is installed around the outside of the first pipe 12, a plurality of jackscrews 22 are adjusted to initially center each frame half on the first pipe 12 while allowing for positional adjustability.

The jackscrews 22 are positioned around the circumference of the first pipe 12 and are arranged radially with respect to the pipe. The threaded jackscrews 22 each pass through threaded openings in the first frame 16 and are threadably engaged therewith. Rotation of each jackscrew moves the jackscrew radially with respect to the first pipe 12.

Likewise, a second pair of arcuate frames 26 surround the second pipe 14 and are joined together when in the closed position. Each of the frames 26 is in the form of a half cylinder. The second pair of frames 26 is joined together around the second pipe when in the closed position. The second pair of frames 26 is installed near but not at the end of the second pipe. One side of the frames 26 may be held together by a hinge 28 which permits rotational movement between an open and closed position. The opposed sides of the frames 26 may be held together when in the closed position by a quick release pin or pins 32.

The inner diameter of the frames 26 is larger than the outer diameter of the pipe 14 so that the system 10 may be used with a variety of pipe diameter sizes.

Once the second pair of frames 26 is installed around the second pipe 14, a plurality of jackscrews 34 are adjusted, which are arranged around the circumference of the second pipe 14. The threaded jackscrews 34 each pass through threaded openings in the frames 26 and engage the exterior surface of the second pipe 14. Rotation of each jackscrew moves the jackscrew radially with respect to the first pipe 12.

A plurality of turnbuckles 36 extends between the first pair of frames 16 and the second pair of frames 26. The location of each of the frames 16 and 26 is adjusted along the axis of the pipe so that the turnbuckles 36 can connect the frames 16 and 26 using quick release pins and are centered over the gap between the pipes. The frames are then rotated so that they are aligned with the turnbuckle mating features.

Each of the turnbuckles 36 is connected on one side to the first pair of frames 16 and connected on the other opposed side to the second pair of frames 26. The turnbuckles 36 are connected to the frames by a detachable connection, such as a quick release pin 38. Accordingly, the first pair of frames 16 is joined to the second pair of frames 26.

FIG. 3 illustrates a side view of the system 10, which is capable of adjustment in three dimensions. Arrows 24 and 30 in FIG. 3 illustrate x and y dimension positioning, respectively. The jackscrews 22 and 34 are used to adjust the x/y positions of the pipes 12 and 14 until the first pipe 12 is axially aligned with the second pipe 14. Once pipe alignment is optimized in the x/y positions, any loose jackscrews 22 and 34 are then threaded or screwed tight against the pipes to provide clamping force necessary for the turnbuckle alignment.

The turnbuckles 36 each include a body having opposed threaded openings to receive opposed threaded shafts. The body of each turnbuckle 36 may then be rotated to adjust the z position shown by arrow 35 seen in FIG. 2 until a gap of a desired value is achieved.

After the x/y position has been optimized, if reforming of either pipe is required to improve pipe alignment, the respective jackscrews are tightened additionally to apply the force necessary for the desired reforming of one or both pipes. Accordingly, the system is capable of adjusting positioning of each of the adjacent pipes in all three dimensions or directions.

The pipe alignment system 10 maintains a consistent space between the ends of the pipes 12 and 14 and holds the pipes in place during welding operations.

Figure 4:
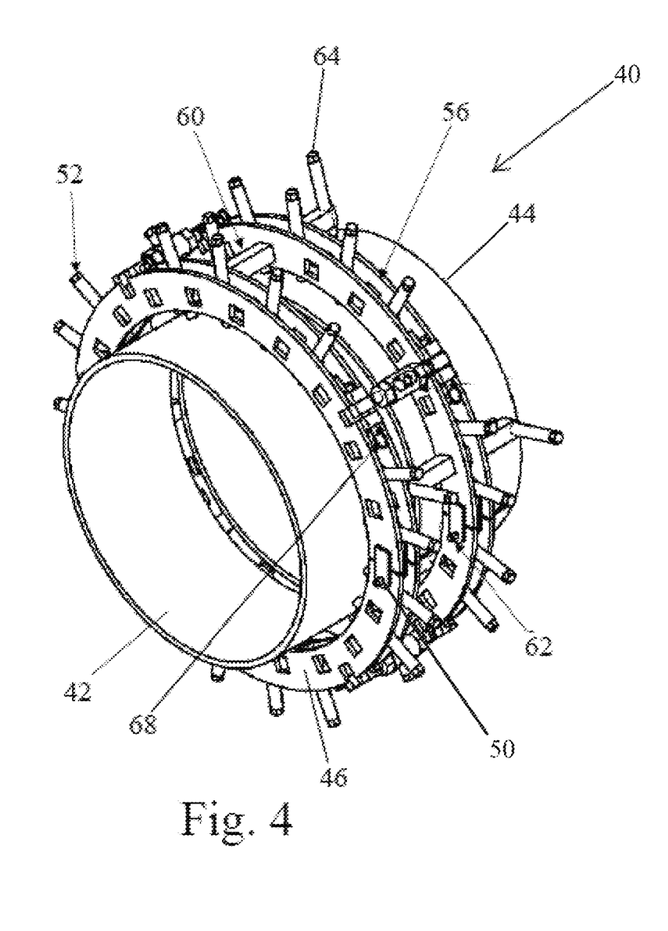
FIG. 4 illustrates a perspective view of a second preferred embodiment of a pipe alignment system constructed in accordance with the present invention.
Figure 5:
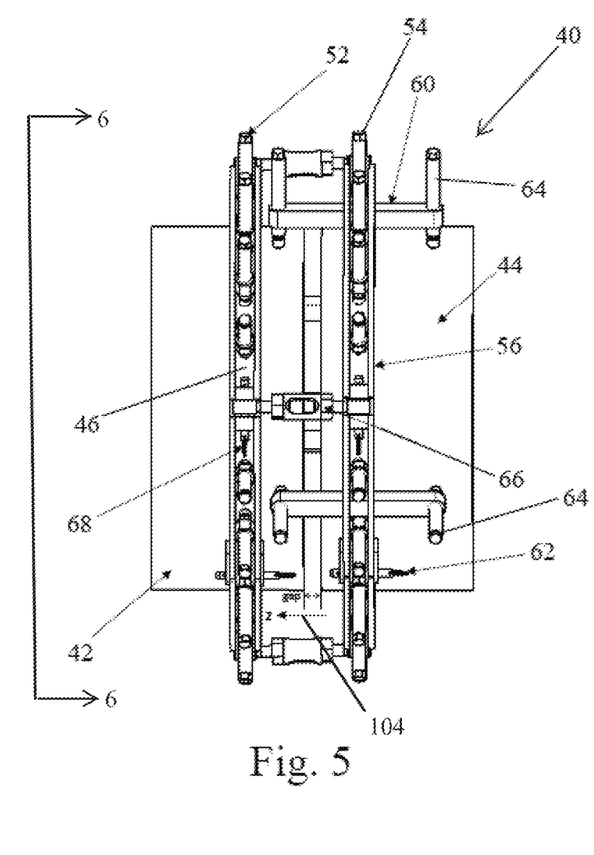
FIG. 5 illustrates a front view of the pipe alignment system shown in FIG. 4.
Figure 6:
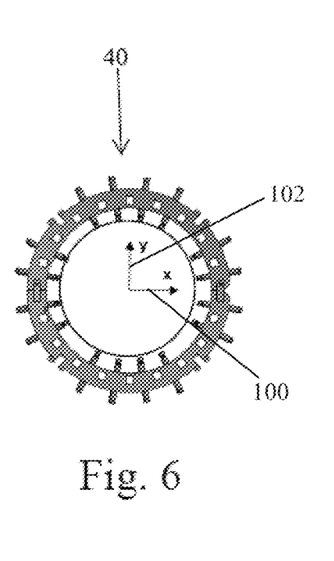
FIG. 6 illustrates a side view of the pipe alignment system shown in FIG. 4.

FIG. 4 illustrates a perspective view, FIG. 5 illustrates a front view and FIG. 6 illustrates a sectional view of a second preferred embodiment of a pipe alignment system 40.

A first tube or pipe 42 having a pipe end is moved adjacent a second tube or pipe 44 having a pipe end. In one configuration, the pipe ends should be within 1 to 2 inches from each other, but not touching.

A first pair of arcuate frames 46 surrounds the first pipe 42. Each of the frames is in the form of a half cylinder. The first pair of frames is drawn together around the first pipe 42 when in the closed position surrounding the pipe. The first pair of frames 46 is installed near but not at the end of the first pipe 42. In one configuration, a hinge 48 permits rotational movement of the first pair of frames 46 between an open position in order to install and remove the frames and a closed position as shown in FIGS. 4, 5 and 6. The frames 46 may be held together when in the closed position by a quick release pin or pins 50 through aligned openings.

The inner diameter of the frames 46 is larger than the outer diameter of the pipe 42 so that the system 40 may be used with a variety of pipe diameter sizes.

Once the first pair of frames 46 is installed around the outside of the first pipe 42, a plurality of jackscrews 52 are adjusted to initially center each frame half on the first pipe while allowing for positional adjustability.

The jackscrews 52 are positioned around the circumference of the first pipe 42 and are each arranged radially with respect to the pipe. The threaded jackscrews each pass through threaded openings in the first pair of frames 46 and are threadably engaged therewith. Rotation of each jackscrew moves the jackscrew radially with respect to the first pipe 42.

Likewise, a second pair of arcuate frames 56 surround the second pipe 44 and are joined together when in the closed position. Each of the frames 56 is in the form of a half cylinder. The second pair of frames 56 is joined together around the second pipe when in the closed position. The second pair of frames 56 is installed near but not at the end of the second pipe. One side of the frames 56 may be held together by a hinge 58 which permits rotational movement between an open and closed position. The opposed sides of the frames may be held together when in the closed position by a quick release pin or pins 62.

The inner diameter of the frames 56 is larger than the outer diameter of the second pipe 44 so that the system may be used with a variety of pipe diameter sizes.

Once the second pair of frames 56 is installed around the second pipe 44, a plurality of jackscrews 54 are arranged around the circumference of the second pipe 44. The threaded jackscrews 54 pass through threaded openings in the second pair of frames 56 and engage the exterior surface of the second pipe 44. Rotation of each jackscrew moves the jackscrew radially with respect to the first pipe 42.

A plurality of turnbuckles 66 extends between the first pair of frames 46 and the second pair of frames 56. The location of each of the frames 46 and 56 is adjusted along the axis of the respective pipe so that the turnbuckles 66 can connect the frames using a quick release pin and are centered over the gap between the pipes.

Each of the turnbuckles 66 is connected on one side to the first pair of frames 46 and connected on the other opposed side to the second pair of frames 56. The turnbuckles 66 are connected to the frames by a detachable connection, such as a quick release pin 68.

FIG. 6 illustrates a sectional view of the system 40, which is capable of adjustment in three dimensions. Arrows 100 and 102 illustrate x and y dimension positioning, respectively. The jackscrews 64 are used to adjust x/y positions of the pipes until the first pipe is axially aligned with the second pipe 44. Any loose jackscrews 52 and 54 are then threaded or screwed tight against the pipes to provide clamping force necessary for turnbuckle alignment.

The turnbuckles 66 each include a body having opposed threaded openings to receive threaded shafts. The body of each turnbuckle 66 may then be rotated to adjust the z position shown by arrow 104 seen in FIG. 5 until a gap of a desired value is achieved.

After the x/y position has been optimized, if reforming of either pipe is required to improve pipe alignment, the respective jackscrews 52 and 54 are tightened additionally to apply the force necessary for the desired reforming of the pipes.

Jackbars 60 and jackscrews 64 are used for adjustment of the x/y position. The plurality of jackbars 60 pass through and are laterally adjustable in at least one of the frames 46 or 56. Each jackbar 60 has a jackscrew 64 engaging the first pipe 42 and a jackscrew 64 engaging the second pipe 44.

The pipe alignment system 40 brings the pipe ends into alignment, performs any reforming, maintains a consistent space between the ends of the pipes, and holds the pipes 42 and 44 in place during welding operations.

Figure 7:
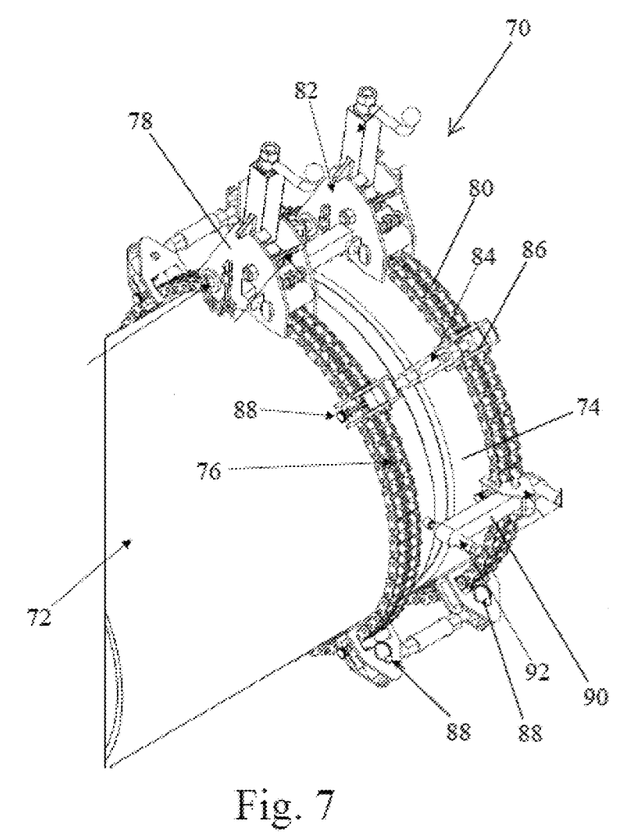
FIG. 7 illustrates a perspective view of a third preferred embodiment of a pipe alignment system constructed in accordance with the present invention.
Figures 8, 9, 10:
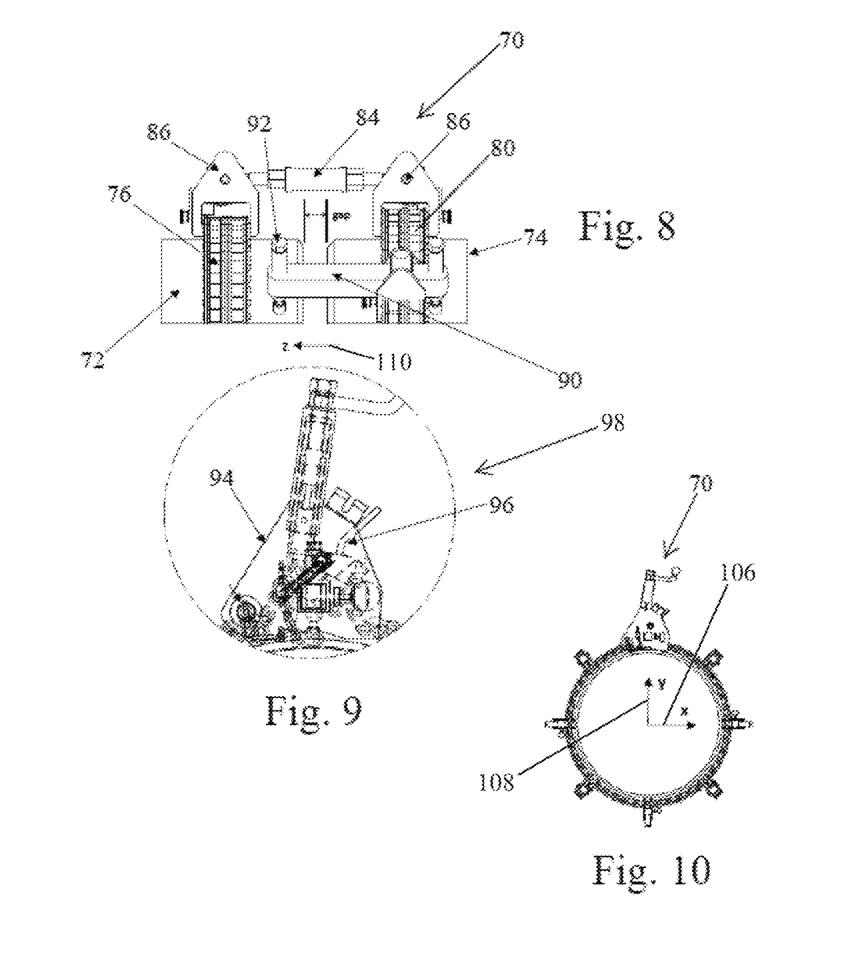
FIG. 8 illustrates an enlarged view of a portion of the pipe alignment system shown in FIG. 7.
FIG. 9 illustrates a sectional view of a portion of the pipe alignment system shown in FIG. 7.
FIG. 10 illustrates a side view of the pipe alignment system shown in FIG. 7.

FIG. 7 illustrates a perspective view, FIG. 8 illustrates an enlarged view of a portion, FIG. 9 illustrates a partial cut-away view, and FIG. 10 illustrates a sectional view of a third preferred embodiment of a pipe alignment system 70.

A first pipe or tube 72 having a pipe end is moved adjacent a second pipe or tube 74 having a pipe end. In one preferred configuration, the pipe ends should be within 1 to 2 inches from each other, but not touching.

With reference to FIG. 9 and continuing reference to FIG. 7, a first chain 76 is brought around the outside or circumference of the first pipe 72. One end of the first chain 76 is attached to a tensioning mechanism 98 on a main block 78. The other end of the chain is threaded through the main block 78 and held in place by a chain dog 96 or similar fastener.

Likewise, a second chain 80 surrounds the outside or circumference of the second pipe 74. One end of the second chain 80 is attached to a tensioning mechanism 98 on a main block 82. The other end of the chain is threaded through the block 82 and held in place by a chain dog 96 or similar fastener.

A plurality of turnbuckles 84 extend between the first chain 76 and the second chain 80. Each turnbuckle includes a body having opposed threaded openings to receive threaded shafts. A number of pusher-puller blocks 86 are attached to each of the chains 76 and 80. The pusher-puller blocks 86 may be attached to the chains by clamping or other action. A turnbuckle 84 extends between pairs of pusher-puller blocks 86. The turnbuckle 84 may be secured to the pusher-puller blocks by a quick release pin or pins 88.

A plurality of universal jackbars 90 are attached to one of the chains 76 or 80. The jackbars 90 are adjustable laterally, movable parallel to the axis of the pipe. Jackscrews 92 pass through threaded openings in the jackbars 90 and engage the pipes 72 and 74.

In order to install each chain in clamping position, the chain is fed through a number of universal jackbars 90 and a number of pusher-puller blocks 86. The free end of the chain is fed through a main block of a tensioning mechanism and held in place by a chain dog, leaving enough slack to wrap the chain loosely around the pipe. The chain is then wrapped around the pipe when the tensioning mechanism 98 is placed onto the receiving end and held in place by a chain lock. The majority of the chain slack is then removed by pulling the excess chain through the chain dog. Once securely on the pipe, the respective chains are adjusted along the axis of the pipe so that the turnbuckle assemblies 84 are attached to the puller blocks using the quick release pin 88. Thereafter, a rotating gear on a threaded ratchet device rotated by a handle on the tensioning mechanism 98 on each chain can be engaged until each chain has been pulled tight against the respective pipe.

Using the jackscrews 92 on the universal jackbars 90, the x/y position of each pipe can be adjusted, as shown by the arrows 106 and 108, respectively, in FIG. 10.

Thereafter, a body of each turnbuckle 84 is rotated, which adjusts the z position of the pipes 72 and 74, as seen by the arrow 110 in FIG. 8.

The pipe alignment system brings the pipe ends into alignment, maintains a consistent space between the pipe ends, and holds the pipes in place both before and during welding operations.

Whereas, the invention has been described in relation to the drawings attached hereto, it should be understood that other and further modifications, apart from those shown or suggested herein, may be made within the scope of this invention.

What is claimed is:

1. A pipe alignment apparatus to align a pair of adjacent pipe ends together, which apparatus comprises:
    a first chain circumnavigating a first pipe adjacent an end thereof;
    a first mechanical tensioning mechanism to tighten said first chain;
    a second chain circumnavigating a second pipe adjacent an end thereof;
    a second mechanical tensioning mechanism to tighten said second chain;
    a plurality of universal jackbars attached to said first chain or said second chain; and
    a plurality of adjustable turnbuckles extending between said first chain and said second chain.

2. A pipe alignment apparatus as set forth in claim 1 wherein each of said universal jackbars includes at least one jackscrew engaging said first pipe and at least one jackscrew engaging said second pipe.

3. A pipe alignment apparatus as set forth in claim 2 wherein each said jackscrew is arranged radially with respect to said pipe ends.

4. A pipe alignment apparatus as set forth in claim 1 wherein each of said plurality of adjustable turnbuckles includes a detachable connection with said first chain and includes a detachable connection with said second chain.

5. A pipe alignment apparatus as set forth in claim 1 wherein said first mechanical tensioning mechanism includes a lock in a main block retaining one end of said first chain and a rotating gear to tighten said chain around said pipe.

6. A pipe alignment apparatus as set forth in claim 1 wherein said second mechanical tensioning mechanism includes a lock in a main block retaining one end of said second chain and a rotating gear to tighten said chain around said pipe.

\* \* \* \* \*